United States Patent [19]

Tyrrell et al.

[11] Patent Number: 5,839,171
[45] Date of Patent: Nov. 24, 1998

[54] STRAP ANCHORING MEANS

[76] Inventors: Anthony C. Tyrrell, 1861 SW. 55th Ave., Plantation, Fla. 33317; Todd A. Tyrrell, 3186 W. Buena Vista Dr., Margate, Fla. 33063

[21] Appl. No.: 856,760

[22] Filed: May 15, 1997

[51] Int. Cl.[6] .............................. B60R 21/10; A44C 5/18
[52] U.S. Cl. .................................. 24/265 BC; 24/163 R; 24/265 R
[58] Field of Search ....................... 24/265 BC, 265 AL, 24/265 R, 307, 163 R, 198, 200, 186, 633

[56] References Cited

U.S. PATENT DOCUMENTS

| | | | |
|---|---|---|---|
| 1,198,228 | 9/1916 | Hirsh | 24/265 BC |
| 3,037,257 | 6/1962 | Girodet | 24/265 R X |
| 4,005,904 | 2/1977 | Weman et al. | |
| 4,142,274 | 3/1979 | Scholz et al. | 24/163 R |
| 4,291,822 | 9/1981 | Simonds | |
| 4,365,391 | 12/1982 | Chapalain | |
| 4,372,301 | 2/1983 | Hubbard et al. | 24/265 R X |
| 4,527,313 | 7/1985 | Sylvan | |
| 4,642,853 | 2/1987 | Plesniarski et al. | 24/163 R |
| 5,146,657 | 9/1992 | Frano | 24/265 BC X |
| 5,247,820 | 9/1993 | Kosugi | 24/163 R X |
| 5,542,160 | 8/1996 | Arndt | 24/265 BC X |
| 5,592,718 | 1/1997 | Mohr | 24/265 R X |

FOREIGN PATENT DOCUMENTS 2126469  3/1984  United Kingdom .............. 24/265 BC

*Primary Examiner*—James R. Brittain
*Assistant Examiner*—Robert J. Sandy
*Attorney, Agent, or Firm*—Alvin S. Blum

[57] ABSTRACT

An anchor for attaching a strap or belt to a panel is a one piece structure having a web attached to two flanges such that the flanges extend parallel to one another and spaced apart by a distance greater than the panel thickness. Each flange has a free end with a transverse aperture forming a loop to receive the strap therethrough. The panel has an arcuate slot near the edge. The free end of one of the flanges is passed through the slot to mount the anchor on the panel with the web within the slot and the loops beyond the edge of the panel to receive the belt in a fixed belt loop or an adjustable snubbing arrangement. The web has a curved inner margin to permit limited swivelling motion.

9 Claims, 2 Drawing Sheets

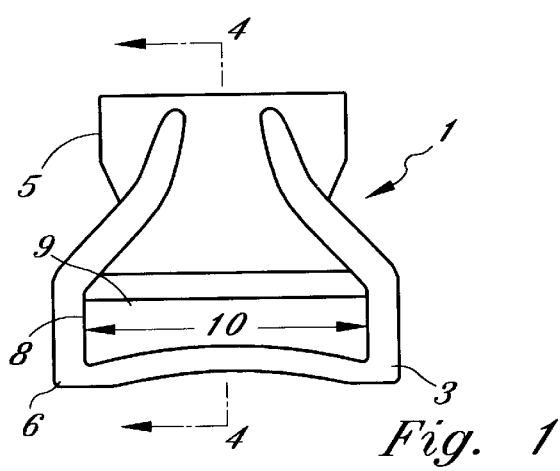
Fig. 1
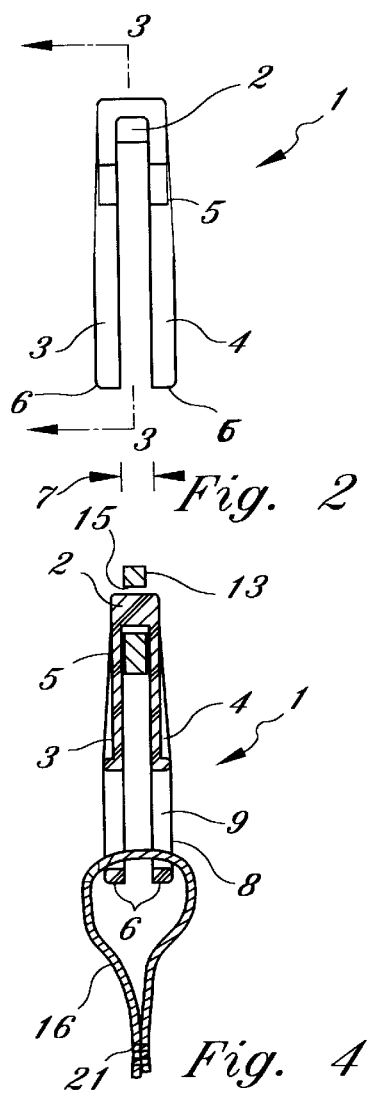
Fig. 2
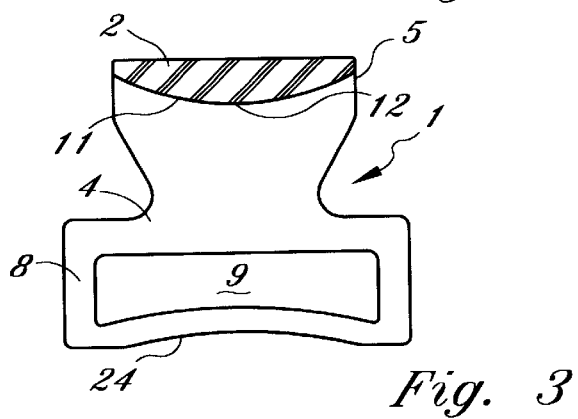
Fig. 3
Fig. 4
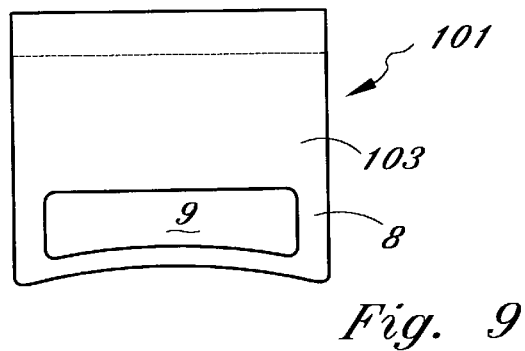
Fig. 9
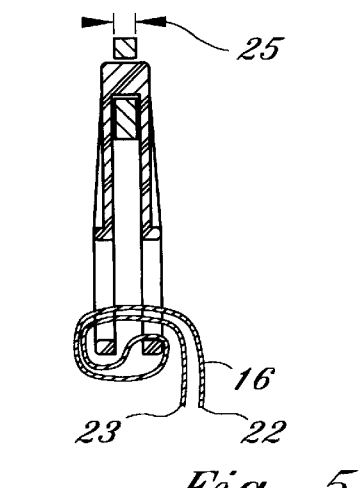
Fig. 5
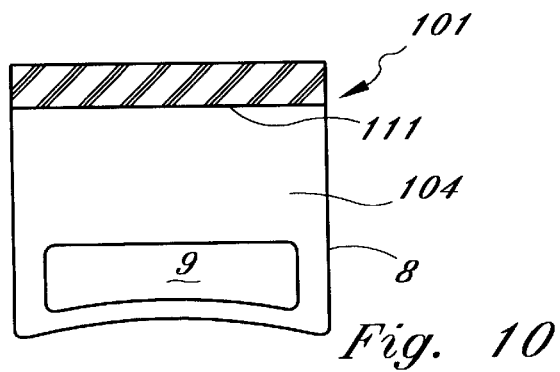
Fig. 10

STRAP ANCHORING MEANS

BACKGROUND OF THE INVENTION

This invention relates to fasteners for straps and belts and more particularly to means for attaching a belt or strap to another structure such as a brace with a loop through which the strap passes. Straps and belts are often used to secure in place such diverse elements as orthotics, splints, braces, baseball chest protectors, harnesses, musical instruments, ski boots, and even vehicle passengers. The strap end may be simply riveted to the panel to which it is being anchored, but this puts excessive localized stresses on only a small portion of the strap. When the strap end must be adjustable or removable, it is common practice to pass the belt end through a loop and anchor the loop to the panel by a bracket that is bolted or riveted to a surface of the panel, with arrangements for the bracket to swivel about the rivet to provide a degree of freedom. This arrangement has some disadvantages, especially with splints and braces. The rivet is radioopaque and may interfere with x-ray studies. The bracket may swivel too far from its useful position and either wrinkle the strap or make it difficult to move the strap through the loop. When drawing the strap up tight, various items may inadvertently be caught or pinched between the bracket and the panel surface. These items may include: the tongue of a boot, clothing, and even skin. The conventional anchor device includes several separate items and processes including attaching the loop to the bracket, punching a hole in the panel, and riveting.

SUMMARY OF THE INVENTION

It is accordingly an object of the invention to provide a means for anchoring a strap to a panel that is a single piece, that requires no rivet or bolt fastening, that is readily applied and removed without tools, that provides swiveling, but through only a limited angle, and that prevents the inadvertent catching of items between the anchoring means and the surface of the panel. It is yet another object that the anchoring means provide a double loop so that the strap length may be adjusted and locked by a snubbing action.

The strap anchoring means of the invention comprises a one piece anchor element having two flanges parallel to one another and spaced apart by a distance at least as great as the panel thickness. The flanges are each joined at a first end to a web element. The flanges are each provided at a free second end with a transverse slot. The panel is provided with an arcuate slot wide enough to pass therethrough the free end of one of the flanges. The web is provided with an arcuate inner shape corresponding to the arcuate slot. When the anchor element is mounted on the panel with the web in the slot and a flange on either side of the panel, the element will slide or pivot relative to the panel, but only to the limits of the slot. A pair of loops, one extending from each of the opposed surfaces of the panel are provided by the transverse slots at the free ends of the flanges. These loops receive the end of a strap or belt to anchor the strap or belt to the panel.

These and other objects, advantages and features of the invention will become more apparent when the detailed description is considered in conjunction with the drawings in which like reference numerals are applied to like elements in the various figures.

BRIEF DESCRIPTION OF THE DRAWINGS

FIG. 1 is a plan view of the anchor of the invention.

FIG. 2 is a side view of the anchor.

FIG. 3 is a sectional view taken through line 3—3 of FIG. 2.

FIG. 4 is a sectional view taken through line 4—4 of FIG. 1 in place on a panel with a strap affixed to the anchor.

FIG. 5 is a sectional view as in FIG. 4 with a strap adjustably snubbed on the anchor.

FIG. 9 is a plan view of another embodiment of the anchor of the invention.

FIG. 10 is a sectional view as in FIG. 3 of the anchor of FIG. 10.

DETAILED DESCRIPTION OF PREFERRED EMBODIMENTS

Figure 6:
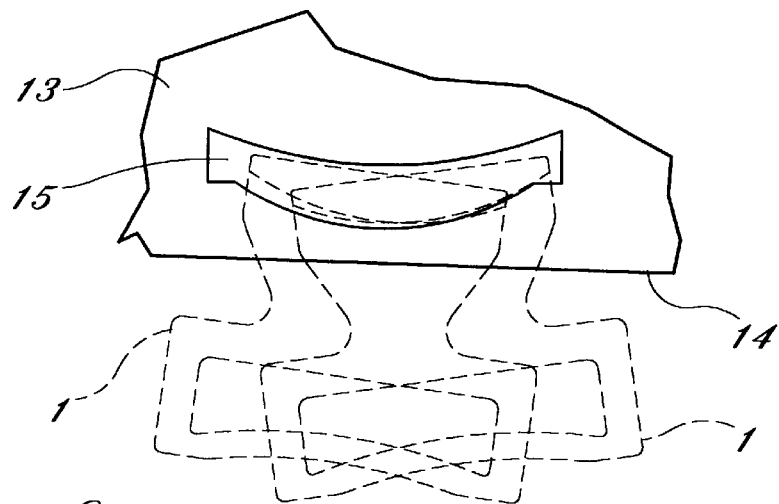
FIG. 6 is a top view of a panel with an arcuate slot and anchors shown in phantom at different swivel angles.

Referring now first to FIGS. 1–8, an anchor 1 of the invention may be molded in one piece of material such as plastic so as to be economical and also radiolucent when it is mounted on a brace or splint that must be x-rayed. The anchor comprises a web 2 joined to two flanges 3, 4 at their first ends 5, such that the flanges lie parallel to one another and spaced apart by a first distance 7. The free second end 6 of each flange is provided with a transverse aperture 9 having a width 10. The first end 5 of each flange is smaller than the second end 6. The web 2 has a curvilinear inner margin 11 whose center 12 extends toward the free ends 6 of the flanges.

Figure 7:
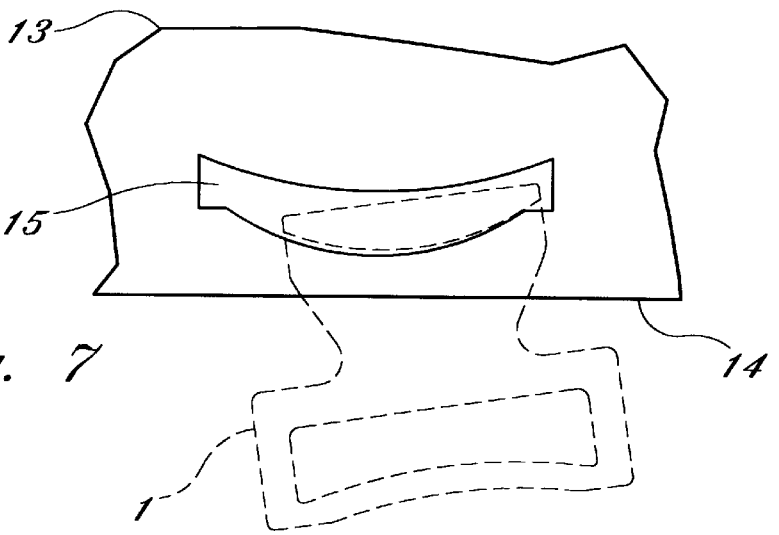
FIG. 7 is a top view of a panel with another shape arcuate slot and an anchor shown in phantom.

As best seen in FIGS. 6 and 7, when a panel 13 is provided with an arcuate slot 15, of one shape or another, at an edge 14 that is to be pulled or put under tension by a strap 16, the anchor 1, is simply installed by passing the free end 6 of one of the flanges through the slot such that there is a flange on either side of the panel with the web within the slot and the free ends 6 of the flanges and their apertures 9 extending past the edge 14 to provide a pair of loops 8 around which a strap 16 can be fastened.

The inner curvilinear margin 11 of the web rotates or swivels on the arcuate slot surface to provide a free swiveling action through a limited angle until the web impinges on the slot edges. FIG. 6 illustrates, by the positions of two phantom anchors, the limits of swivel motion.

As shown in FIG. 4, the strap 16 may be passed through the two loops and then secured with stitches 21 to permanently anchor the strap to the panel. Alternatively, the two loops may be employed to provide for an adjustable attachment of the strap to the panel. When the strap is looped as shown in FIG. 5, the pull exerted on the loaded end 16 of the strap will pull the two loops together exerting a clamping effect on the strap in the snubbing action well known in the art of buckles and strap fasteners. The flanges should have sufficient resilience for this motion to take place. The apertures 9 in the loops should have a width 10 at least as great as the strap width to best distribute the forces on the strap. The free end 24 of the loop may have an inward curve so that when put under tension by the strap, it will become straight and better distribute force on the strap. The distance 7 that the flanges are spaced apart should be at least as great and preferably greater than the thickness 25 of the panel so that the anchor can swivel freely in the slot.

The strap may be secured by other means well known in the art such as buckles,hook-and-loop fasteners, and the like.

Figure 8:
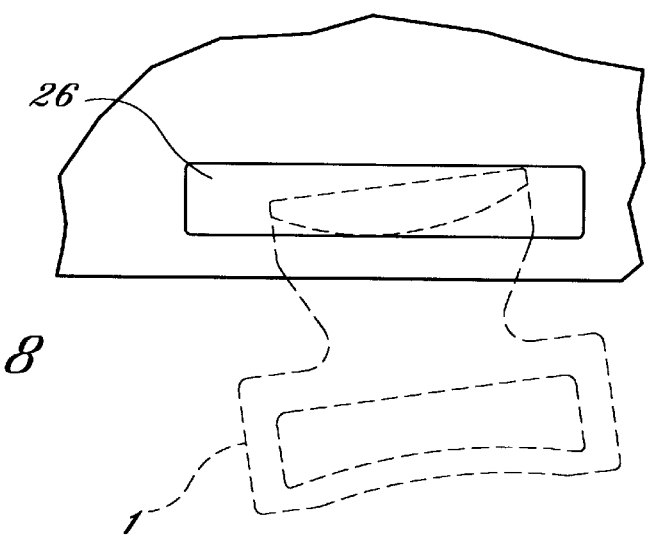
FIG. 8 is a view of a panel with a rectangular slot and an in phantom.

FIG. 8 illustrates the swivel action of the anchor in a rectangular slot 26. This arrangement puts a more concentrated force at a tangential meeting of slot and anchor that may not be suitable in some situations. The swivel action is very desirable in many situations, such as when it is difficult to align two edges of an arm splint with only one hand. In other situations such as securing a ski boot, this may not be necessary. In that case, the non-swivel embodiment shown in FIGS. 9 and 10 may be more useful. The anchor 101 has flanges 103, 104 that are the same width at both ends. The web 102 has a straight inner margin 111 for engagement in a rectangular slot.

The term strap is meant to refer equally to a belt. The term panel is meant to refer to any structure having an edge portion with a limited thickness so that the flanges may be mounted on either side thereof.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. An anchor for securing a strap to a panel, the anchor comprising:

a web having two lateral edges and extending continuously from one lateral edge to the other lateral edge;

a first flange having a first end and a free second end;

a second flange having a first end and a free second end;

each flange being attached at the first end to the web such that the flanges are disposed substantially parallel to one another and spaced apart by a first distance;

each flange having said free second end wider than the first end, said second end provided with a loop formed by a transverse aperture in the flange, the aperture having a first width and being located closer to said second end than the first end;

the web having a curvilinear margin facing between the flanges such that the center of the web is closer to said second ends than are the lateral edges; and the anchor being adapted to engage an edge of a panel of a thickness about equal to or less than said first distance in which there is an arcuate slot, by having the free end of one of the flanges pass through the slot so that the anchor may be removably mounted with the web within the slot with the curvilinear margin of the web rotatable on the arcuate slot for limited swivelling action and a flange on either side of the panel with the loops extending past the edge of the panel and adapted for receiving therethrough a strap having a width less than said first width.

2. The anchor according to claim 1, in which the flanges have sufficient resiliency that they may be drawn together by the strap to provide a snubbing action.

3. The anchor according to claim 1 wherein said anchor is molded in a single piece of material.

4. An anchor for securing a strap to a panel, the anchor comprising:

a web having two lateral edges and extending continuously from one lateral edge to the other lateral edge;

a first flange having a first end and a free second end;

a second flange having a first end and a free second end;

each flange being attached at the first end to the web such that the flanges are disposed substantially parallel to one another and spaced apart by a first distance;

each flange having said free second end wider than the first end, said second end provided with a loop formed by a transverse aperture in the flange, the aperture having a first width and being located closer to said second end than the first end;

the anchor being adapted to engage an edge of a panel of a thickness about equal to or less than said first distance in which there is a slot, by having said free end of one of the flanges pass through the slot so that the anchor may be removably mounted with the web within the slot and a flange on either side of the panel with the loops extending past the edge of the panel and adapted for receiving therethrough a strap having a width less than said first width.

5. The anchor according to claim 4, in which the flanges have sufficient resiliency that they may be drawn together by the strap to provide a snubbing action.

6. The anchor according to claim 4 wherein said anchor is molded in a single piece of material.

7. An anchor for securing a strap to a panel, the anchor comprising:

a web having two lateral edges and extending continuously from one lateral edge to the other lateral edge;

a first flange having a first end and a free second end;

a second flange having a first end and a free second end;

each flange being attached at the first end to the web such that the flanges are disposed substantially parallel to one another and spaced apart by a first distance;

each flange having said free second end wider than the first end, said second end provided with a loop formed by a transverse aperture in the flange, the aperture having a first width and being located closer to said second end than the first end;

the web having a curvilinear margin facing between the flanges such that the center of the web is closer to said second ends than are the lateral edges; and the anchor being adapted to engage an edge of a panel of a thickness about equal to or less than said first distance in which there is a slot, by having the free end of one of the flanges pass through the slot so that the anchor may be removably mounted with the web within the slot with the curvilinear margin of the web rotatable on the slot for limited swivelling action and a flange on either side of the panel with the loops extending past the edge of the panel and adapted for receiving therethrough a strap having a width less than said first width.

8. The anchor according to claim 7 in which the flanges have sufficient resiliency that they may be drawn together by the strap to provide a snubbing action.

9. The anchor according to claim 7 wherein said anchor is molded in a single piece of material.

* * * * *